(12) United States Patent
Lee et al.

(10) Patent No.: US 8,446,873 B2
(45) Date of Patent: May 21, 2013

(54) METHOD FOR UPLINK TRANSMISSION OF CONTROL INFORMATION IN MOBILE COMMUNICATION SYSTEM

(75) Inventors: Hyun Woo Lee, Seoul (KR); Min Seok Noh, Seoul (KR); Yeong Hyeon Kwon, Inchen-si (KR); Jin Sam Kwak, Anyang-si (KR); Dong Cheol Kim, Seoul (KR); Sung Ho Moon, Seoul (KR); Seung Hee Han, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/994,696

(22) PCT Filed: May 29, 2009

(86) PCT No.: PCT/KR2009/002882
§ 371 (c)(1),
(2), (4) Date: Nov. 24, 2010

(87) PCT Pub. No.: WO2009/145592
PCT Pub. Date: Dec. 3, 2009

(65) Prior Publication Data
US 2011/0069672 A1    Mar. 24, 2011

Related U.S. Application Data

(60) Provisional application No. 61/056,837, filed on May 29, 2008.

(30) Foreign Application Priority Data

Apr. 3, 2009    (KR) .......................... 10-2009-0028811

(51) Int. Cl.
*H04W 72/02*    (2009.01)
*H04B 72/208*    (2006.01)
*H04B 72/212*    (2006.01)
*H04J 1/00*    (2006.01)

(52) U.S. Cl.
USPC ........... 370/330; 370/337; 370/345; 370/480; 455/450; 455/452.1

(58) Field of Classification Search
USPC ................ 370/279, 280, 294–295, 329–330, 370/468, 336, 347; 375/260, 295; 455/450, 455/452.1, 452.2
See application file for complete search history.

(56) References Cited

U.S. PATENT DOCUMENTS 5,604,744 A * 2/1997 Andersson et al. ........... 370/347
5,917,826 A * 6/1999 Naessl et al. .................. 370/442
(Continued)

FOREIGN PATENT DOCUMENTS
WO    WO 2006-134830 A1    12/2006

*Primary Examiner* — Candal Elpenord
(74) *Attorney, Agent, or Firm* — McKenna Long & Aldridge LLP

(57) ABSTRACT

A method for uplink transmitting control information in a mobile communication system is disclosed. A method for uplink transmitting control information in a mobile communication system includes receiving control channel configuration information for indicating a first period about a time interval in which a control channel is repeatedly allocated and a second period about a time interval in which the control channel is repeatedly allocated in accordance with the first period, generating a control channel at a predetermined position in a time-frequency resource region for uplink transmission in consideration of the first period and the second period, and transmitting control information through the generated control channel.

9 Claims, 16 Drawing Sheets

U.S. PATENT DOCUMENTS

| | | | |
|---|---|---|---|
| 6,370,128 B1 * | 4/2002 | Raitola | 370/329 |
| 6,424,645 B1 * | 7/2002 | Kawabata et al. | 370/347 |
| 6,473,410 B1 * | 10/2002 | Sakoda et al. | 370/330 |
| 7,443,907 B2 * | 10/2008 | Nakamura et al. | 375/140 |
| 7,873,010 B2 * | 1/2011 | Love et al. | 370/330 |
| 2003/0123396 A1 | 7/2003 | Seo | |
| 2004/0258084 A1 * | 12/2004 | Laroia et al. | 370/437 |
| 2008/0095195 A1 * | 4/2008 | Ahmadi et al. | 370/478 |
| 2008/0212543 A1 * | 9/2008 | Ban | 370/336 |
| 2008/0219236 A1 * | 9/2008 | Love et al. | 370/347 |
| 2010/0296477 A1 * | 11/2010 | Hason et al. | 370/330 |

\* cited by examiner

METHOD FOR UPLINK TRANSMISSION OF CONTROL INFORMATION IN MOBILE COMMUNICATION SYSTEM

This application is a National Stage Entry of International Application No. PCT/KR2009/002882, filed May 29, 2009, and claims the benefit of U.S. Provisional Application No. 61/056,837, filed May 29, 2008 and Korean Application No. 10-2009-0028811, filed on Apr. 3, 2009, each of which is hereby incorporated by reference for all purposes as if fully set forth herein.

TECHNICAL FIELD

The present invention relates to a mobile communication system for supporting a Time Division Duplex (TDD) scheme, a Full-Frequency Division Duplex (F-FDD) scheme or a Half-Frequency Division Duplex (H-FDD) scheme, and more particularly to a method for uplink transmitting control information in a mobile communication system.

BACKGROUND ART

The principal standards established by the Institute of Electrical and Electronics Engineers (IEEE) 802.16 task group are classified into IEEE 802.16-2004 also known as a Fixed WiMAX and an IEEE 802.16e-2005 (hereinafter referred to as '16e') also known as a mobile WiMAX. The IEEE 802.16e-2005 was finalized by the IEEE on December 2005. Basic standards of a current-version mobile WiMAX technology include IEEE 802.16-2004, IEEE 802.16e-2005 (including Corrigenda of IEEE 802.16-2004), and IEEE 802.16-2004/Corrigenda2/D4. Nowadays, IEEE 802.16m (hereinafter referred to as '16 m') standardization for the next-version mobile WiMAX is being intensively conducted in a TGm of the IEEE 802.16 task group.

DISCLOSURE

Technical Problem

Information of a Ranging channel type and information of a time/frequency domain in the IEEE 802.16e are broadcast in an uplink MAP (UL_MAP). Orthogonal Frequency Division Multiple Access (OFDMA) UL-MAP Information Element (IE) formats are shown in the following Tables 1 and 2.

TABLE 1

| Syntax | Size (bit) | Notes |
|---|---|---|
| UL-MAP_IE( ) { | — | — |
|     CID | 16 | — |
|     UIUC | 4 | — |
|     if (UIUC == 11) { | — | — |
|         Extended UIUC 2 dependent IE | variable | See 8.4.5.4.4.2 |
|     } | — | — |
|     else if (UIUC == 12) { | — | — |
|         OFDMA Symbol offset | 8 | — |
|         Subchannel offset | 7 | — |
|         No. OFDMA Symbols | 7 | — |
|         No. Subchannels | 7 | — |
|         Ranging Method | 2 | 0b00: Initial ranging/Handover Ranging over two symbols<br>0b01: Initial ranging/Handover Ranging over four symbols<br>0b10: BR/periodic ranging over one symbol<br>0b11: BR/periodic ranging over three symbols |
|         Dedicated ranging indicator | 1 | 0: The OFDMA region and ranging method defined are used for the purpose of normal ranging<br>1: The OFDMA region and ranging method defined are used for the purpose of ranging using dedicated CDMA code and transmission opportunities assigned in the MOB_PAG-ADV message, in the RNG-RSP message, or in the MOB_SCN-RSP message. |
|     } else if (UIUC == 13) { | — | — |
|         PAPR_Reduction_and_Safety_Zone_Sounding Zone Allocation_IE | 32 | — |
|     } else if (UIUC == 14) { | — | — |
|         CDMA_Allocation_IE( ) | 40 | — |
|     } else if (UIUC == 15) { | — | — |
|         Extended UIUC-dependent IE | variable | See 8.4.5.4.4.1 |
|     } else if (UIUC == 0) { | — | — |
|         FAST-FEEDBACK_Allocation_IE( ) | 32 | — |

TABLE 2

| Syntax | Size (bit) | Notes |
|---|---|---|
| } else { | — | — |
|     Duration | 10 | In OFDMA slots (see 8.4.3.1) |
|     Repetition coding indication | 2 | 0b00: No repetition coding |
| | | 0b01: Repetition coding of 2 used |
| | | 0b10: Repetition coding of 4 used |
| | | 0b11: Repetition coding of 6 used |
|     if (AAS or AMC UL Zone) { | — | AAS/AMC Allocations include absolute slot effect. |
|     Slot offset | 12 | Offset from start of the AAS or AMC zone for this allocation, specified in slots. |
|     } | — | — |
| } | — | — |
| } | | |

Time- and frequency-information of a ranging channel being broadcast in the UL_MAP is transmitted at every frame (5 ms), so that considerably large overhead is generated. Therefore, an improved method is needed, which is capable of reducing control overhead being broadcast to establish a control channel, and effectively and variably employing time/frequency resources of the control channel.

Technical Solution

Accordingly, the present invention is directed to a method for uplink transmitting control information in a mobile communication system that substantially obviates one or more problems due to limitations and disadvantages of the related art.

An object of the present invention is to provide a method for effectively transmitting control information to solve the problems encountered in the related art.

Another object of the present invention is to provide a method for reducing signaling overhead requisite for establishing an uplink control channel and effectively utilizing resources.

Still another object of the present invention is to provide a method for reducing ranging-associated control overhead, and effectively and variably utilizing time/frequency resources.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for uplink transmitting control information in a mobile communication system includes receiving control channel configuration information for indicating a first period about a time interval in which a control channel is repeatedly allocated and a second period about a time interval in which the control channel is repeatedly allocated in accordance with the first period, generating a control channel at a predetermined position in a time-frequency resource region for uplink transmission in consideration of the first period and the second period, and transmitting control information through the generated control channel.

The mobile communication system may perform communication using a superframe, in which one superframe includes a plurality of frames, each frame includes a plurality of subframes, and each subframe includes a plurality of orthogonal frequency division multiple access (OFDMA) symbols. The first period may be indicated on a basis of any one of a superframe unit, a frame unit, a subframe unit, or an OFDMA symbol unit, and the second period may be indicated on a basis of a superframe'S divisor unit or a superframe'S multiple unit. The control channel configuration information may be received through a header of the superframe.

The predetermined position where the control channel is generated may include at a time domain a start or end part of the time-frequency resource region for the uplink transmission.

The first period may start after an offset elapses from a start point of the second period. The first period may start after an offset elapses from a preamble. The offset may be indicated on a basis of any one of a frame unit, a superframe unit, or an OFDMA symbol unit.

The predetermined position where the control channel is generated may be frequency-hopped in a frequency domain using a predetermined scheme. The predetermined position where the control channel is generated may be frequency-hopped toward both ends of the frequency domain.

A plurality of control channels allocated within the second period in consideration of the first period may be configured in such a manner that the number of control channels is irregular.

The first period may be applied in units of a user equipment (UE) group.

The predetermined position where the control channel is generated may be differently configured in units of a cell or sector.

The first period and the second period may be indicated using an index for indicating a combination of the first and second periods. In more detail, the first period and the second period may be selected from among a table composed of a combination of the first and second periods, and the first and second periods may be indicated using an index for indicating the selected combination.

The control channel may include a ranging channel. In this case, the ranging channel may include an initial ranging channel, a handover ranging channel, a periodic ranging channel, or a bandwidth request channel.

The mobile communication system may support any of a Time Division Duplex (TDD) scheme, a Full-Frequency Division Duplex (F-FDD) scheme or a Half-Frequency Division Duplex (H-FDD) scheme.

It is to be understood that both the foregoing general description and the following detailed description of the present invention are exemplary and explanatory and are intended to provide further explanation of the invention as claimed.

Advantageous Effects

As apparent from the above description, the exemplary embodiments of the present invention have the following effects.

First, the present invention enables effective transmission of control information.

Second, the present invention can reduce signaling overhead required to establish an uplink control channel, and can effectively use resources.

Third, the present invention can reduce control overhead associated with ranging, and can effectively and variably time/frequency resources.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Figure 1:
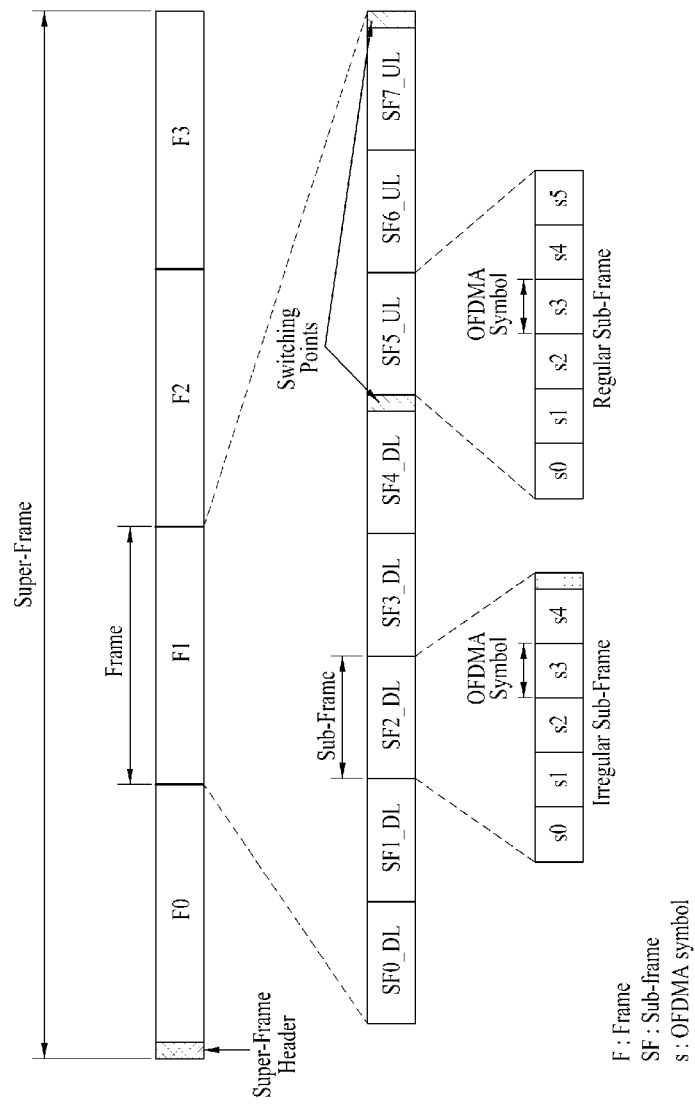
FIG. 1 exemplarily shows an Institute of Electrical and Electronics Engineers (IEEE) 802.16m frame structure.

FIG. 1 exemplarily shows an IEEE 802.16m frame structure.

Referring to FIG. 1, the IEEE 802.16m frame has a hierarchical structure composed of a superframe (20 ms), a frame (5 ms), subframes (an irregular subframe of 0.514 ms and a regular subframe of 0.617 ms), and an Orthogonal Frequency Division Multiple Access (OFDMA) symbol. In more detail, one subframe is composed of 5 or 6 OFDMA symbols, one frame is composed of 8 subframes, and one superframe is composed of 4 frames. A superframe header is inserted into a start part of each superframe. The superframe header transmits system information that is not frequently changed in a system. For convenience of description and better understanding of the present invention, FIG. 1 exemplarily shows a frame structure for use in a Time Division Duplex (TDD) scheme. The TDD frame structure includes a switching point between a downlink (DL) subframe and an uplink (UL) subframe. Although not shown in FIG. 1, except that a Frequency Division Duplex (FDD) frame structure has no switching point between subframes and an idle time is present between frames, the remaining parts of the FDD frame structure is similar to those of the TDD frame structure.

The present invention provides a method for reducing overhead of broadcast information associated with a control channel. In more detail, in order to reduce broadcast information overhead related to a control channel position, the present invention provides a method for enabling a control channel to have a predefined or semi-predefined position in a time-frequency resource region for UL transmission.

Although the present invention can be applied to various control channels, the scope or spirit of the present invention is not limited thereto, and the present invention will be described on the basis of an uplink (UL) ranging channel for convenience of description and better understanding of the present invention. The present invention is not limited in terms of control channel structure, code type, code category, and the like. Whether to use a localized frequency band or a distributed frequency band has no relevance to the scope or spirit of the present invention. For convenience of description and better understanding of the present invention, categories of the frequency band will be described without distinction between frequency bands. For convenience of description and better understanding of the present invention, although the present invention will hereinafter be described on the basis of a regular subframe (frame type 1), not only the regular subframe (frame type 1) but also an irregular subframe (frame type 2) can be used in the present invention without any restriction.

DETAILED EXAMPLE 1

Predefined Time Position

A time position of a ranging channel may be predefined using a repeat period interval (also called "Trd" or "second period") and a period (also called "Td" or "first period"). In this case, the repeat period interval (Trd) indicates a unit in which a ranging channel is repeated at intervals of a predetermined period (Td). In other words, the ranging channel may be allocated at intervals of a predetermined time in consideration of the period (Td). In this case, the period (Td) may be identical to or greater than zero (0). That is, a time position of the ranging channel is repeated in units of a repeat period interval (Trd), and is repeated in units of a smaller period (Td) within the repeat period interval (Trd). Meanwhile, the period (Td) may also be applied to some parts of the repeat period interval (Trd) instead of the entire area of the repeat period interval (Trd). For example, if necessary, the period (Td) may be applied only to a specific frame within the repeat period interval (Trd), or may be applied only to an even or odd frame.

The repeat period interval (Trd) may include a superframe unit, a superframe's divisor unit, or a superframe's multiple unit. For example, if a duration of the superframe is 20 ms, the repeat period interval (Trd) may be set to 20 ms, and the ranging channel may be repeatedly allocated to the period (Td) shorter than the repeat period interval (Trd) of 20 ms. The period (Td) may be established in units of any one of a superframe frame, a frame, a subframe unit, and an OFDMA symbol. For example, the time period (Td) may be set to two frames corresponding to 10 ms or one frame corresponding to 5 ms. The period (Td) may indicate a repeat time interval of a ranging channel. The start position of the period (Td) may be separately signaled or predefined. The start position of the period (Td) may be defined in units of a subframe or an OFDMA symbol in consideration of the ranging structure.

Figure 2:
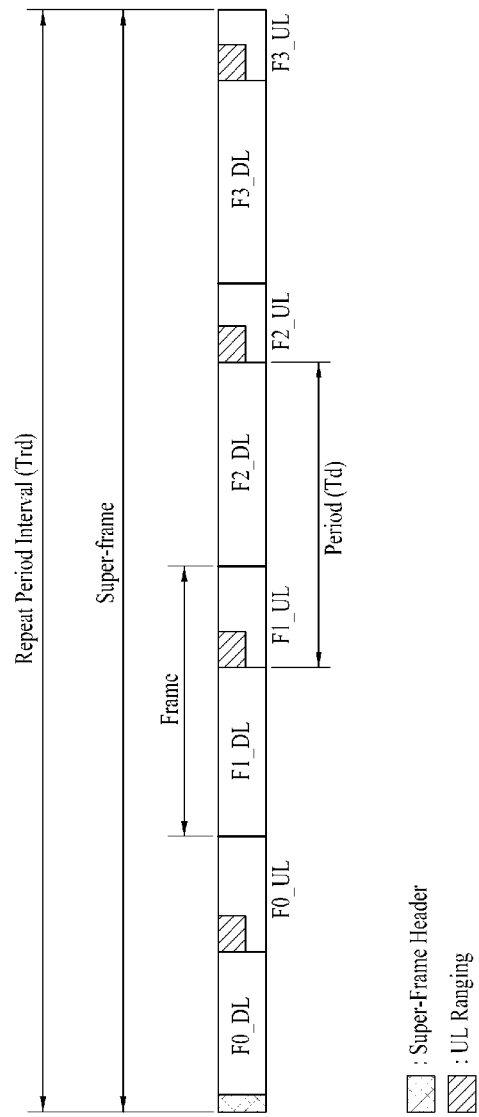
FIG. 2 is a conceptual diagram illustrating a method for allocating a control channel at every frame unit period in a Time Division Duplex (TDD) mode according to one embodiment of the present invention.

FIG. 2 is a conceptual diagram illustrating a method for allocating a control channel at every frame unit period in a Time Division Duplex (TDD) mode according to one embodiment of the present invention.

Referring to FIG. 2, the repeat period interval (Trd) may be set to the length of superframe, and the period (Td) may be set to the length of one frame. In FIG. 2, it is assumed that the UL/DL ratio of the $0^{th}$ frame (F0) and the $1^{st}$ frame (F1) is different from those of second and third frames (F2 and F3). If the UL/DL ratio among frames is different, a time interval actually allocated to a control channel may be irregular. That is, a time interval (i.e., a time slot) actually allocated to a control channel may be different from the period (Td). Accordingly, the ranging channel is allocated to a predetermined position in the UL region in consideration of the repeat period interval (Trd) and the period (Td), instead of being correctly allocated in response to the period (Td). For example, if the period (Td) is given in units of a frame, one ranging channel is allocated to each frame, and several subframes or OFDMA symbols to which the ranging channel can be applied are present in the corresponding frame. In this way, considering that a specific case in which several positions to which the ranging channel can be allocated is present in the UL region, a specific position of the UL region may be assigned for the ranging channel (e.g., a first subframe, etc.)

In FIG. 2, it is assumed that a ranging channel is allocated to a start point of the UL region within a frame. In this case, although the UL/DL ratio of frames is changed, a mobile station (MS) or a user equipment (UE) can recognize the allocation position of the ranging channel without additional signaling. In addition, a base station (BS) receives a ranging signal, and obtains a predetermined time for processing the received ranging signal. As a result, a ranging response can be transmitted to the UE in the frame subsequent to one in which the ranging signal was received. The ranging channel may also be located at the end of the UL region (i.e., the end of the frame). When the ranging channel is located at the end of the UL region, the UE can access the allocated ranging channel although the UE does not know the UL/DL ratio in the TDD scheme nor has incorrect information about the UL/DL ratio. In addition, since the ranging is located at a fixed position irrespective of the TDD or FDD scheme, the system can be easily designed. Specifically, although the UE does not know the UL/DL ratio of a target cell during handover, the UE can recognize a position of a time where the ranging channel is allocated. In the present invention, allocating the ranging channel to a start or end point of the UL region (within a frame) is disclosed for illustrative purposes only, and it should be noted that a predetermined position to which the ranging channel is allocated may include any position belonging to the UL region. The predetermined position may be broadcast through system information, etc., and may also be predefined between a base station (BS) and the UE as necessary.

Figure 3:
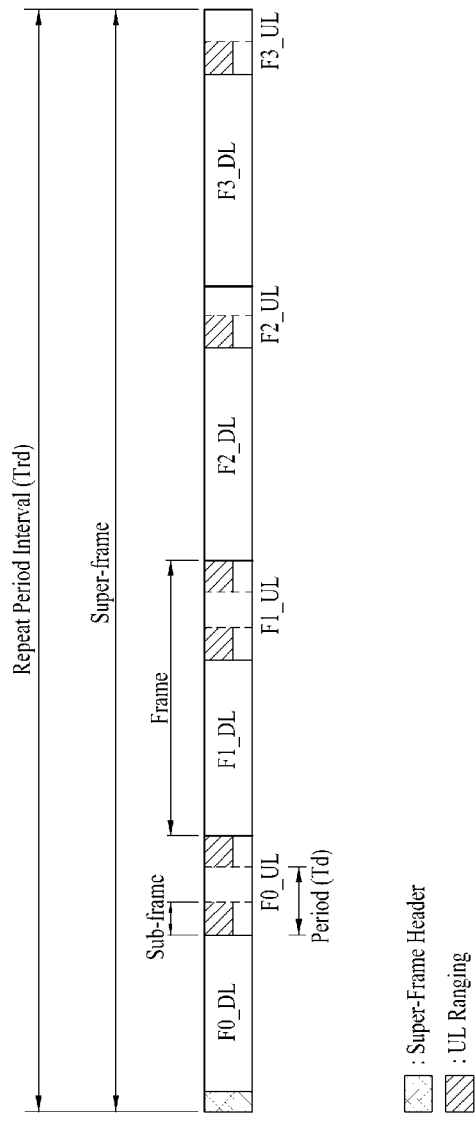
FIG. 3 is a conceptual diagram illustrating a method for allocating a control channel at every subframe unit period in a TDD mode according to one embodiment of the present invention.

FIG. 3 exemplarily shows that the period is established in units of a subframe using a TDD scheme according to one embodiment of the present invention.

Referring to FIG. 3, the repeat period interval (Trd) may be set to the length of a superframe, and the period (Td) may be set to the length of 2 subframes. The ranging channel may be repeated at every period (Td) in UL subframes of each frame. It is assumed that the ranging channel is allocated from a first subframe of the UL region. In FIG. 3, each of the $0^{th}$ frame (F0) and the $1^{st}$ frame (F1) includes three subframes, and each of the second and third frames (F2 and F3) includes two subframes. In the case of the second and third frames, since the number of UL subframes is less than the period (Td), only one ranging channel is allocated to the second or third frame.

FIG. 3 exemplarily shows that the period (Td) is repeated in the direction from the start part to the end part of the UL subframe. Alternatively, the period (Td) may also be repeated in the direction from the end part (i.e., the end of frame) to the start part of the UL subframe. By means of the above-mentioned configuration, the ranging channel can always be located at the end of the UL subframe irrespective of the TDD or FDD scheme.

Figure 4:
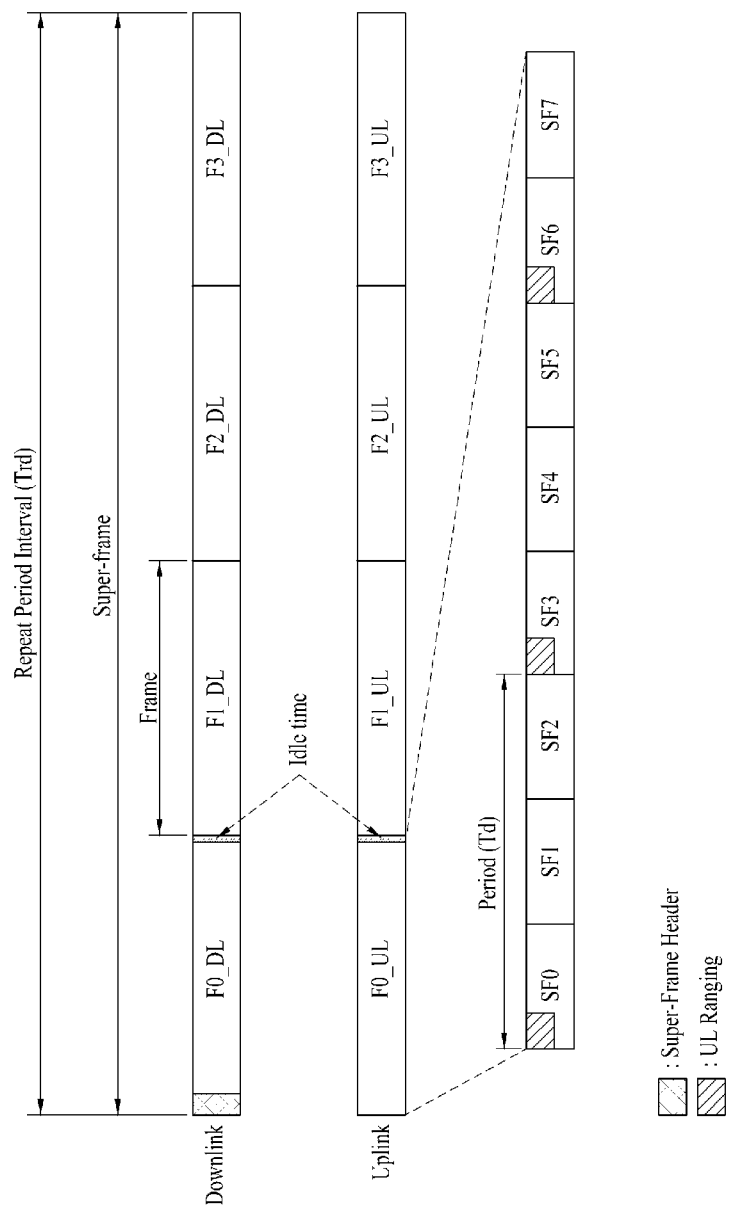
FIG. 4 is a conceptual diagram illustrating a method for allocating a control channel at every subframe unit period in an FDD mode according to one embodiment of the present invention.

FIG. 4 exemplarily shows that the period is established in units of a subframe using an FDD scheme according to one embodiment of the present invention.

Referring to FIG. 4, the repeat period interval (Trd) may be set to the length of a superframe, and the period (Td) may be set to the length of 3 subframes. Overall, FIG. 4 is nearly identical to FIGS. 2 and 3 and a detailed description thereof will be given below with reference to FIGS. 2 and 3.

In the above-mentioned example, the period (Td) may be reset at each frame, may be re-applied to each frame, and may be consecutively applied within the repeat period interval (Trd).

DETAILED EXAMPLE 2

Predefined Start Time in Association with Preamble Position

Detailed Example 1 discloses the time position of the ranging channel using the period (Td) contained in the repeat period interval (Trd). Although Detailed Example 2 also has the period within the repeat period interval (Trd) in the same manner as in Detailed Example 1, Detailed Example 2 shows a method for separately deciding a start time position of the period (Td) because of a specific reason. For example, the period (Td) may start after a predetermined time has elapsed from a start point of the repeat period interval (Trd). In addition, the period (Td) may start after a predetermined time has elapsed from a specific position. The specific position may include a preamble position. In the case of initial ranging or handover ranging, the UE establishes downlink synchronization using a preamble, obtains ranging information from system information being broadcast, and attempts to perform uplink access through a ranging channel. Therefore, it is preferable that the ranging channel be located at a position related to the preamble.

Hereinafter, a method for changing the position of a ranging channel depending upon the period (Td) in relation to the preamble according to the present invention will be given below. However, the following description is disclosed for illustrative purposes only, and it should be noted that the start position of the period (Td) may be changed within the repeat period interval (Trd) as necessary.

In accordance with one example for changing the position of the ranging channel in relation to the preamble, a time position of a first ranging channel is decided depending on the preamble position, and the next ranging channel may be repeatedly allocated in terms of the period (Td) from the time position of the first ranging channel. In more detail, according to the TDD scheme, the ranging channel may be allocated to a UL subframe of a frame related to the preamble. The frame related to the preamble may include a frame including the preamble or may be indicated by an offset on the basis of the frame including the preamble. The offset may be set to 0 or more, and may be established in units of a frame, a subframe, or an OFDMA symbol. The offset may be transmitted together with the repeat period interval (Trd) or the period (Td) to the UE, or may be separately transmitted to the UE.

Figure 5:
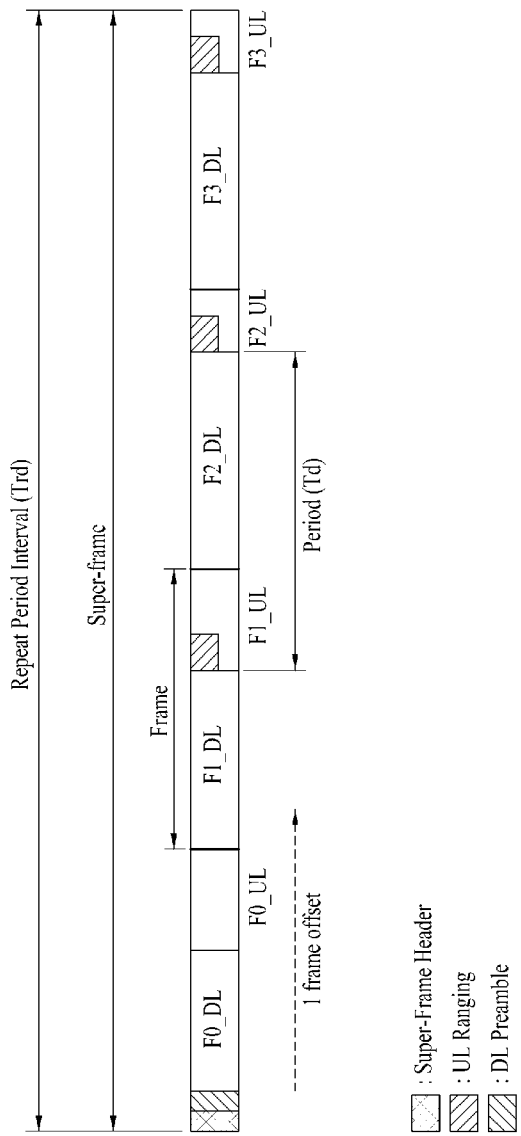
FIG. 5 is a conceptual diagram illustrating one exemplary method for allocating a control channel in association with a preamble in a TDD mode according to one embodiment of the present invention.

FIG. 5 exemplarily shows that an offset related to the period (Td) is established according to a TDD scheme.

Referring to FIG. 5, the repeat period interval (Trd) may be set to the length of a superframe, and the period (Td) may be set to the length of 2 subframes. Since the offset about the period (Td) is set to one frame (from a preamble), the ranging channel is not allocated to a UL subframe (F0_UL) of the first frame and is allocated to individual frames starting from the second frame at every period (Td). The position of the ranging channel allocated in the UL subframe of each frame may be any of predefined positions as described above.

Although not shown in FIG. 5, assuming that an offset is set to the $0^{th}$ frame, the ranging channel is allocated to the UL region belonging to the same frame as that including the preamble. That is, the preamble and the ranging channel are present in the same frame. In this case, after each UE attempting to perform initial access acquires DL synchronization using the preamble, the UE then attempts to establish a connection state through the ranging channel allocated to the UL region contained in the following identical frame, so that it can quickly acquire DL/UL synchronization.

Although not shown in FIG. 5, assuming that an offset is set to one frame, the ranging channel is allocated to the UL region of the next frame of the frame including the preamble. If necessary, the UE may require a predetermined processing time in which the UE receives a preamble and establishes DL synchronization. In addition, the UE may further require a time for acquiring ranging information from broadcast information that is transmitted after preamble transmission or stored in a buffer. As described above, a time delay may be generated between a preamble reception time and an accessible time of the ranging channel, so that it is preferable that the ranging channel be allocated to the next frame located behind the frame where the preamble is located.

Figure 6:
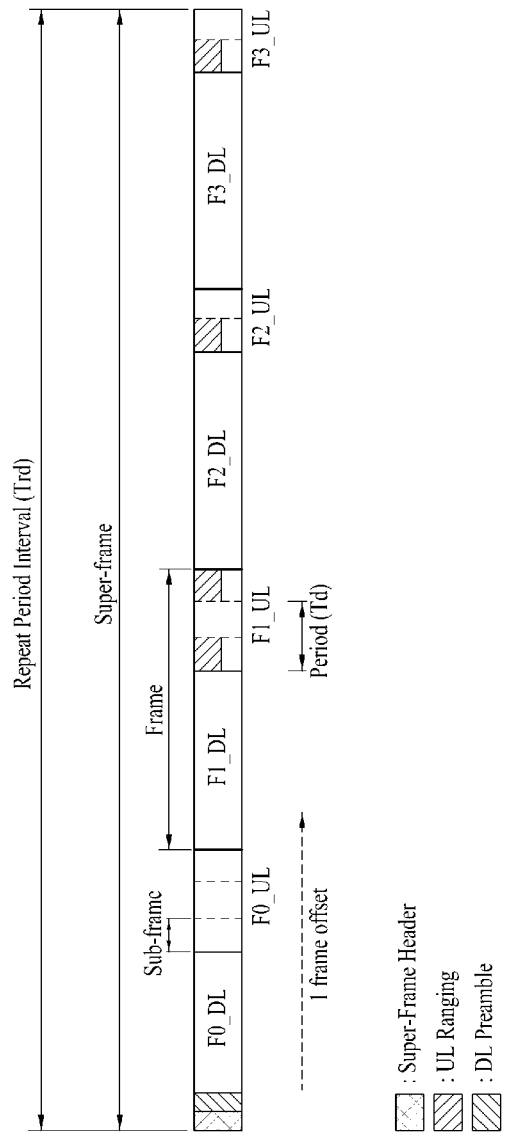
FIG. 6 is a conceptual diagram illustrating another exemplary method for allocating a control channel in association with a preamble in a TDD mode according to one embodiment of the present invention.

FIG. 6 exemplarily shows another case in which an offset related to the period (Td) is established using the TDD scheme. Except that the period (Td) is indicated in units of a subframe, the remaining parts of FIG. 6 are identical to those of FIG. 5, and as such a detailed description thereof will herein be omitted for convenience of description.

Figure 7:
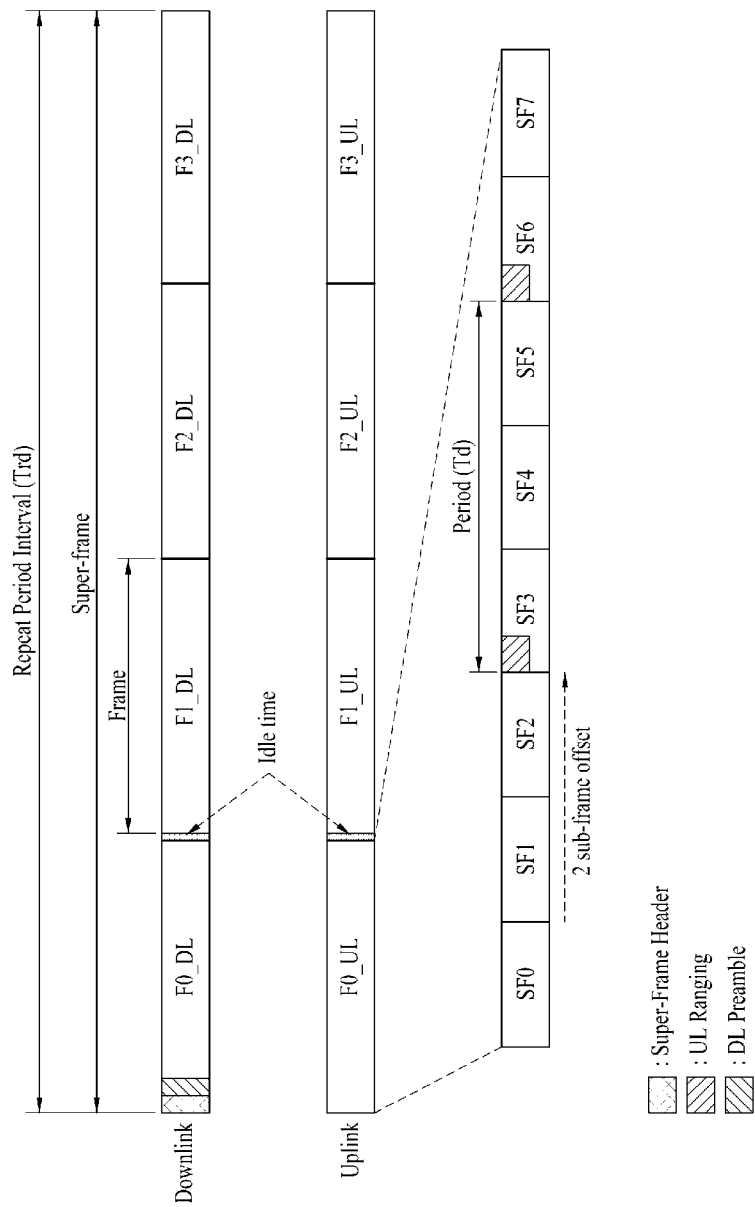
FIG. 7 is a conceptual diagram illustrating an exemplary method for allocating a control channel in association with a preamble in an FDD mode according to one embodiment of the present invention.

FIG. 7 exemplarily shows that an offset related to the period (Td) is established using the FDD scheme.

Referring to FIG. 7, the repeat period interval (Trd) is set to the length of a superframe, and the period (Td) is set to the length of 3 subframes. Since the Td-related offset is set to 2 subframes from the preamble, the ranging channel is not allocated to second and third UL subframes (SF1 and SF2) from the first subframe (SF0) including the preamble, and the ranging channel is allocated to UL subframes starting from the fourth UL subframe (SF3) at every period (Td). The ranging channel position in the UL subframe contained in each frame may be set to any of pre-fixed positions in the same manner as in the above-mentioned description. Although FIG. 7 exemplarily shows a subframe-based offset (i.e., an offset in units of a subframe), a frame-based offset may also be applied to the example of FIG. 7, and the frame-based offset and the subframe-based offset may also be simultaneously applied to the example of FIG. 7.

For convenience of description, the above-mentioned example has exemplarily disclosed a superframe including only one DL preamble. If required, the interval is divided into several units by a preamble, and the present invention may be applied to the divided resultant units.

DETAILED EXAMPLE 3

Predefined Frequency Position

Changing a frequency position where a ranging channel is allocated within a repeat period interval (Trd) may be considered in the present invention. The allocation position of the ranging channel is frequency-hopped within a frequency domain, so that the present invention can obtain the frequency diversity effect during the ranging retrial procedure. Changing the frequency position where the ranging channel is allocated may be performed according to a predefined configuration (or pattern) between the UE and the BS, and the predefined configuration may be changed in units of a predetermined region (such as a cell or sector) or in units of a UE group. As one example for changing the frequency position of the ranging channel, only the start frequency position is fixed in the repeat period interval (Trd), and the subsequent frequency position may be changed according to predefined configuration information. The predefined configuration information may include a specific code, a predefined table, or repeat (e.g., the frequency position of the ranging channel is swung back and forth across both ends of the frequency band at every period Td) of specific frequency positions, etc.

Figure 8:
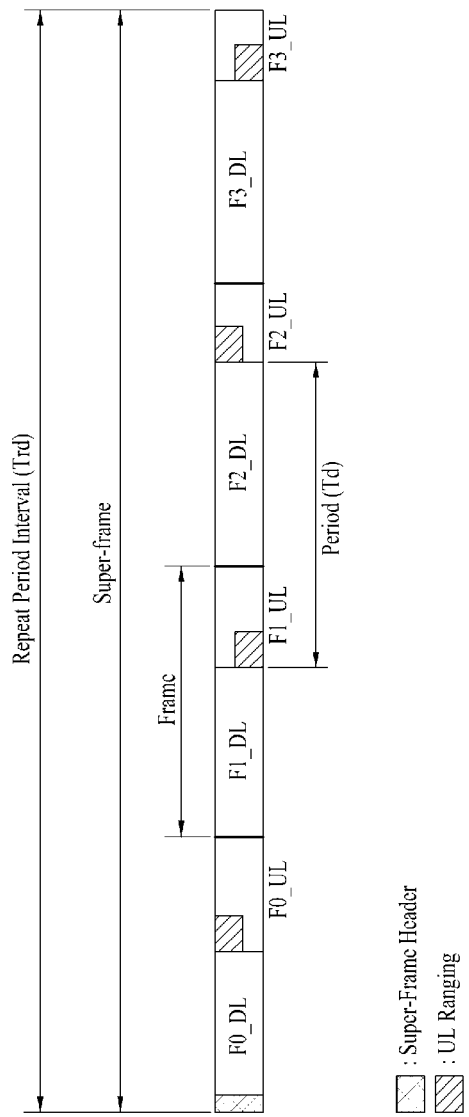
FIG. 8 exemplarily shows that an allocation position of a control channel is frequency-hopped in a frequency domain according to one embodiment of the present invention.

FIG. 8 exemplarily shows that the frequency position of the ranging channel is changed in the example of FIG. 2.

Referring to FIG. 8, the ranging channel is initially allocated to the lowest frequency domain within the repeat period interval (Trd), and is then allocated to the highest frequency domain. The ranging channel is repeatedly allocated to both ends of the frequency band at every period (Td). Although FIG. 8 exemplarily shows the ranging channel that is alternately frequency-hopped toward both ends of the frequency band, the scope or spirit of the present invention is not limited thereto, and the frequency position of the ranging channel can be changed to any of frequency positions as necessary.

Figure 9:
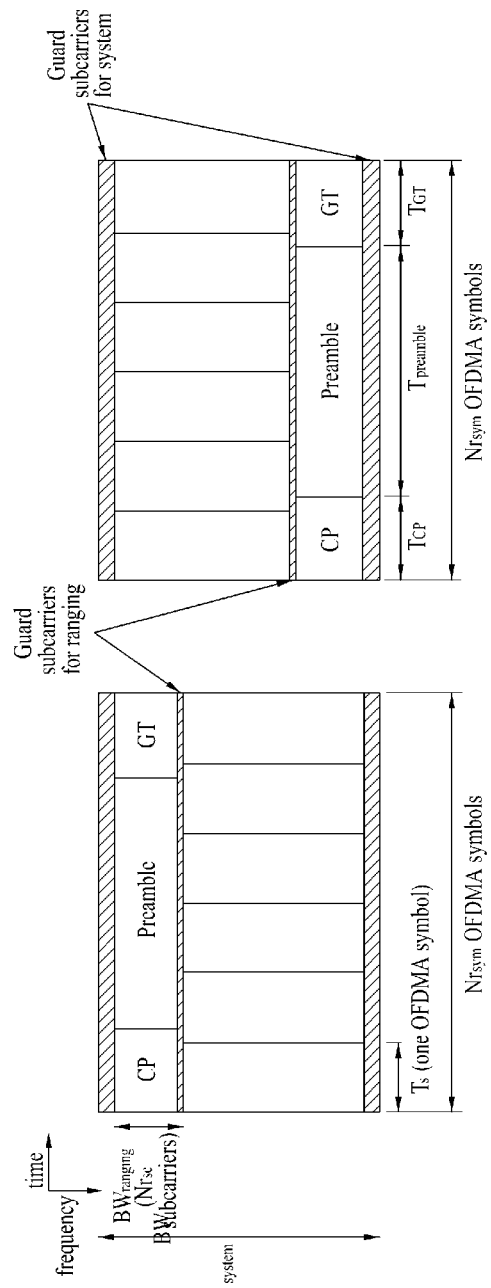
FIG. 9 exemplarily shows that an allocation position of a control channel is frequency-hopped toward both ends of a frequency band in a frequency domain according to one embodiment of the present invention.

FIG. 9 shows a detailed example of FIG. 8 for use in a frequency domain.

Referring to FIG. 9, the ranging structure includes a Cyclic Prefix (CP), a preamble, a Guard Time (GT) spanned by 6 OFDMA symbols, and a ranging guard band (or a ranging guard subcarrier) is contained in both ends of the frequency domain. In order to prevent Inter-Subcarrier Interference (ISI) from occurring in a neighbor channel, the ranging guard band indicates a frequency band in which no signal is actually transmitted. If the ranging channel is frequency-hopped toward both ends of the system frequency band, the ranging guard subcarriers are effectively arranged so that the guard band can be re-used as a ranging guard band. In this case, the ranging guard band is present only in one side of the frequency band for the ranging channel, and is variably arranged at one side including a neighbor channel according to the ranging channel position. Since the ranging guard band is located only at one side of the ranging channel, resources can be more effectively utilized.

FIG. 9 shows an exemplary ranging structure for convenience of description and better understanding of the present invention, and the scope or spirit of the present invention is not limited thereto and other examples can also be applied to the present invention as necessary. For example, the ranging structure may include a structure denoted by "CP+Preamble+CP+Preamble" spanned by several OFDMA symbols, a structure denoted by "CP+Preamble+CP+Preamble+GT" spanned by several OFDMA symbols, etc. in a time domain without any restriction.

DETAILED EXAMPLE 4

Allocation of Ranging Channel Considering Load

In the case of initial ranging or handover ranging, the UE establishes downlink synchronization on the basis of a preamble, obtains ranging information from system information being broadcast, and attempts to perform uplink access through a ranging channel. Therefore, it is preferable that the ranging channel be located at a position related to the preamble. In fact, ranging channels distant from the preamble is rarely used. On the other hand, the ranging procedure is based on contention, and it is preferable that ranging channel be evenly distributed in a time domain so as to obtain latency requisite for retrial.

Accordingly, a larger number of ranging channels (Ranging Set 1) is allocated to a specific-number-th ranging channel from among several ranging channels allocated in response to the period (Td) within the repeat period interval (Trd), and a smaller number of ranging channels (Ranging Set 2) is allocated to the remaining ranging channels, so that latency can be guaranteed and resource overhead can be greatly reduced. The position of Ranging Set 1 may be set to a fixed position within the repeat period interval (Trd). The position of Ranging Set 1 may be set to a position related to a preamble as shown in FIGS. 5 to 7.

Figure 10:
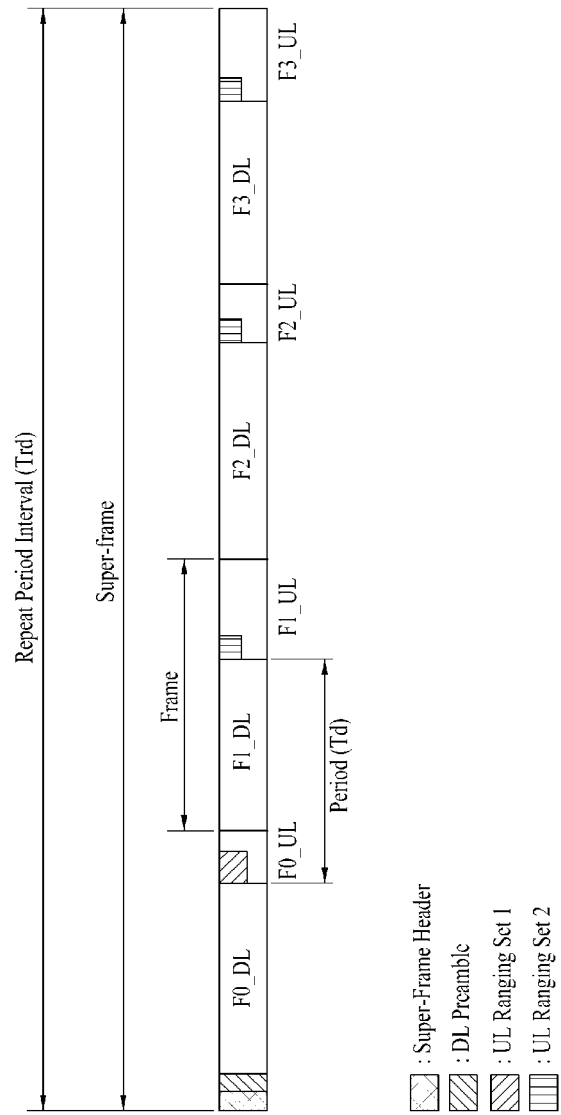
FIG. 10 exemplarily shows that the number of control channels is irregularly allocated to individual loads according to one embodiment of the present invention.

FIG. 10 shows an example of allocating a ranging channel using load according to the present invention.

Referring to FIG. 10, the repeat period interval (Trd) may be set to the length of a superframe, and the period (Td) may be set to the length of a frame. As can be seen from FIG. 10, it is assumed that a firstly allocated ranging channel from among several ranging channels allocated in response to the period (Td) within the repeat period interval (Trd) corresponds to Ranging Set 1, and a ranging channel from the secondly allocated ranging channel corresponds to Ranging Set 2. In this case, a relatively large number of ranging channels is allocated to Ranging Set 1, and a relatively small number of ranging channels is allocated to Ranging Set 2. Although only one Ranging Set 1 is shown in FIG. 10, Ranging Set 1 of FIG. 10 is disclosed for illustrative purposes only, and a plurality of Ranging Sets 1 may be present as necessary.

DETAILED EXAMPLE 5

Legacy Mode

Although the above-mentioned description assumes the IEEE 802.16m mode, this assumption is disclosed for illustrative purposes and better understanding of the present invention, the present invention can also be applied to a legacy mode capable of simultaneously supporting a 16e UE and a 16m UE. In the legacy mode, the 16e region and the 16m region may be divided into TDD or FDD. In comparison with FIG. 2, the above-mentioned examples are shown in FIGS. 11 and 12.

Figure 11:
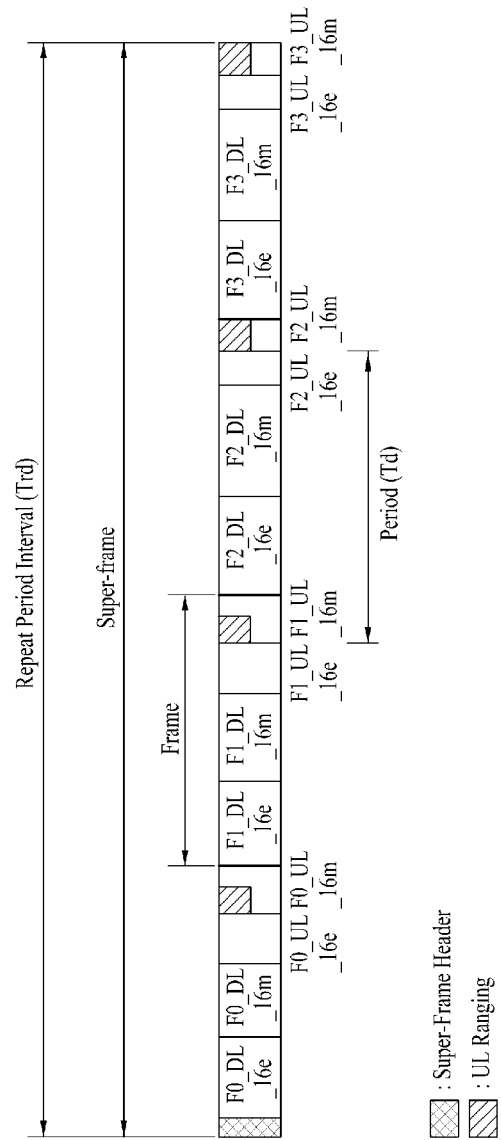
FIG. 11 exemplarily shows that TDD multiplexing is performed in a legacy support mode according to one embodiment of the present invention.

FIG. 11 exemplarily shows how a ranging channel is allocated when data or information is TDD-multiplexed. Differently from FIG. 2, a 16m ranging channel is present at a first 16m UL subframe instead of a first UL subframe of each frame. In conclusion, in order to comprehensively explain a legacy support mode or a 16m-only mode, it is preferable that a ranging channel be defined in a 16m region or a $1^{st}$ UL subframe of a frame.

Figure 12:
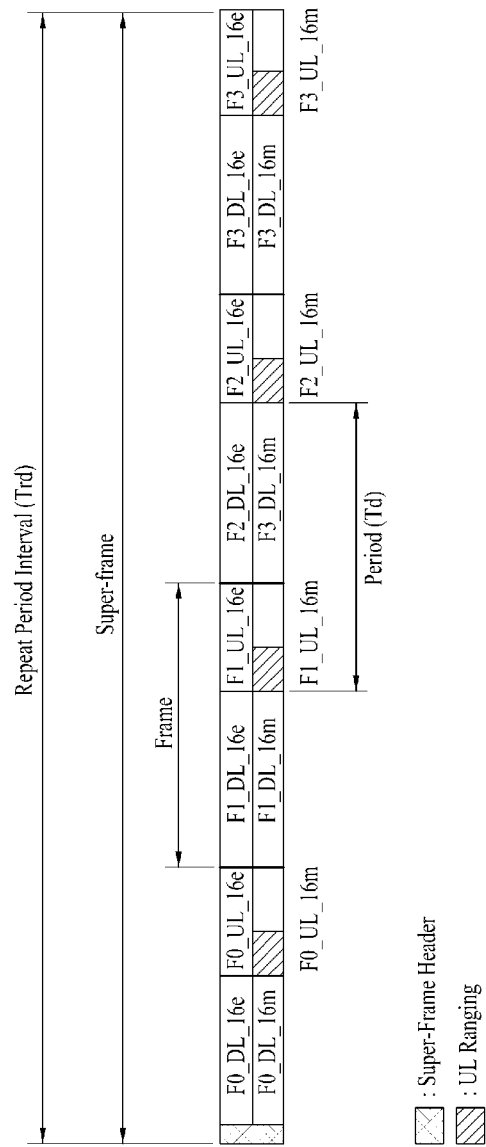
FIG. 12 exemplarily shows that FDD multiplexing is performed in a legacy support mode according to one embodiment of the present invention.

FIG. 12 exemplarily shows that a ranging channel is allocated when data or information is FDD-multiplexed. In this case, although a ranging channel is located at a first UL subframe of each frame in the legacy mode or the 16m-only mode, the 16m ranging channel occupies the 16m frequency band. Whether frequency resources allocated to the 16m ranging channel are localized or distributed has no influence upon the present invention. The frequency position of the 16m ranging channel may be decided by a physical or logical index of a basic resource allocation unit.

Although the above-mentioned description has disclosed exemplary operations for use in the legacy mode for convenience of description and better understanding of the present invention, a UL subframe is replaced with a 16m UL subframe in the aforementioned Detailed Examples, so that the scope or spirit of the present invention can be applied to the legacy mode.

DETAILED EXAMPLE 6

H-FDD (Half-Frequency Division Duplex)

Figure 13:
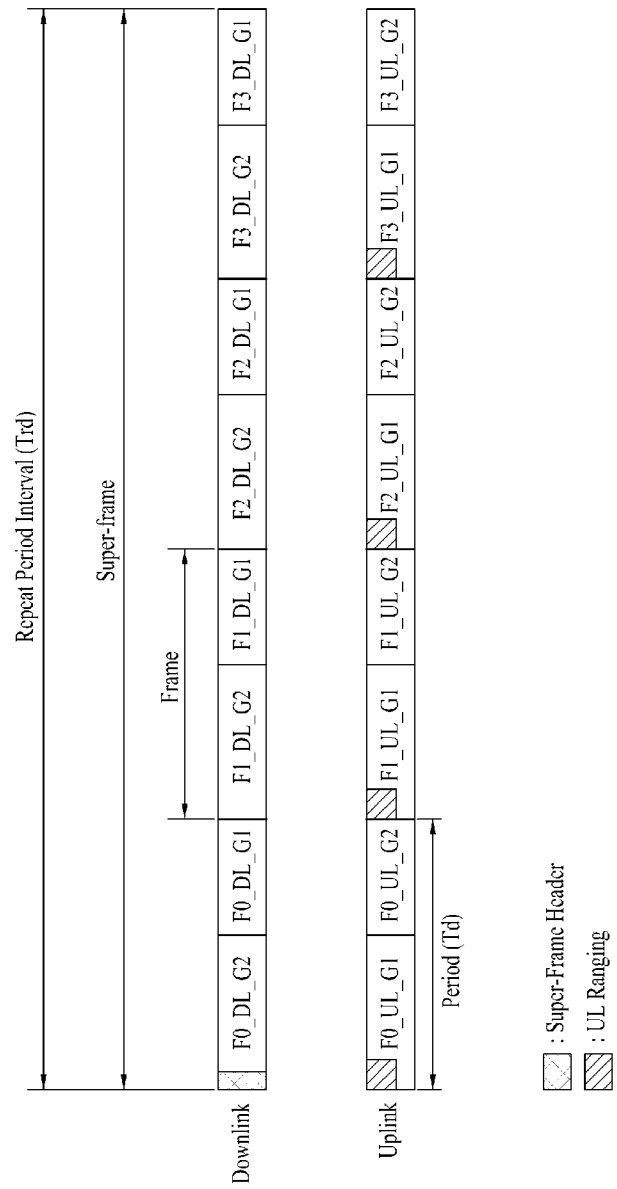
FIG. 13 exemplarily shows that a control channel is allocated only to one of two groups in a Half-Frequency Division Duplex (H-FDD) according to one embodiment of the present invention.
Figure 14:
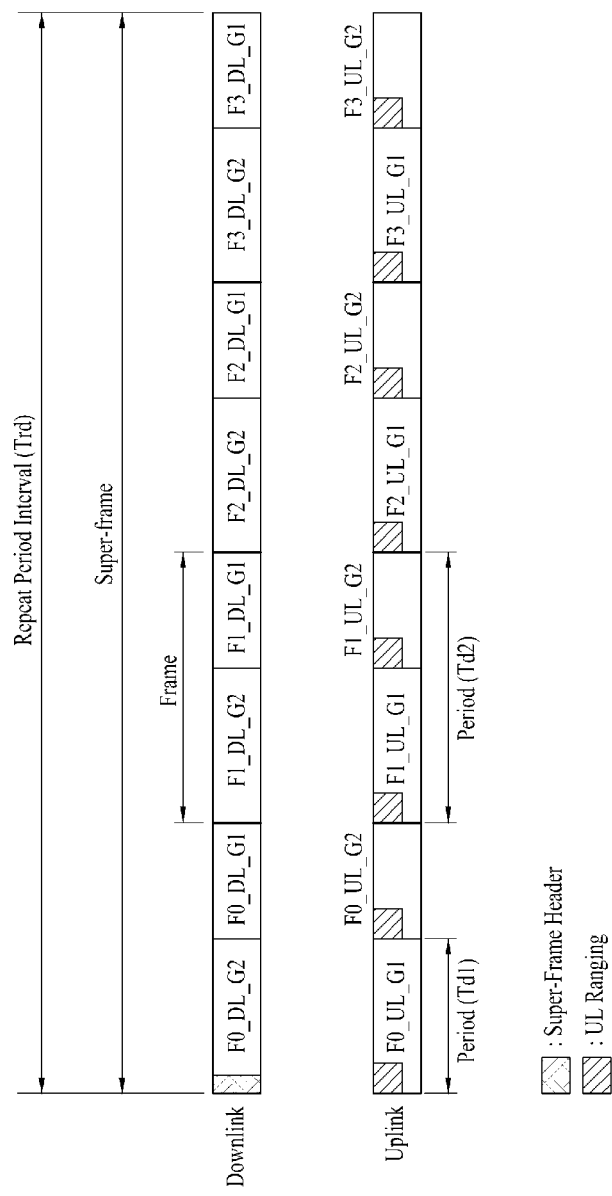
FIG. 14 exemplarily shows that a control channel is allocated in units of a group in an H-FDD caused by two groups according to one embodiment of the present invention.
Figure 15:
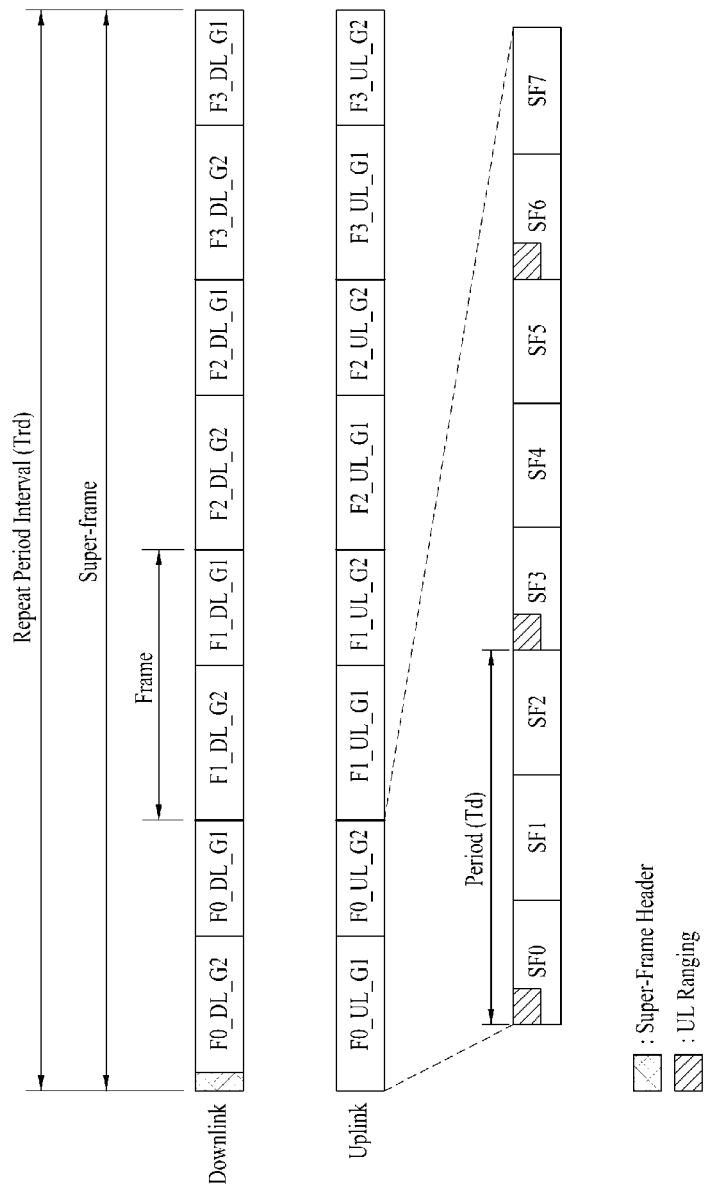
FIG. 15 exemplarily shows that a control channel is allocated in an H-FDD caused by two groups irrespective of groups according to one embodiment of the present invention.

If the above-mentioned description is applied to H-FDD, several UL region groups may be present per frame. FIGS. 13 to 15 exemplarily show that a ranging channel is allocated in H-FDD caused by two groups. In the aforementioned examples, individual UEs belong to Group 1 (G1) or Group 2 (G2), and DL data transmission is performed in the DL region and UL data transmission is performed in the UL region. In this case, the ranging channel can be allocated only to the UL region of a specific group as shown in FIG. 13. Especially, such allocation is beneficial to a first case in which the UE performs initial ranging (or initial random access) or a second case in which the UE performs handover ranging (handover random access). In first and second cases, the UE is not associated with a specific group. Although FIG. 13 has exemplarily disclosed that the ranging channel is allocated only to a Group 1 region (UL_G1), the ranging channel may also be allocated to a Group 2 region (UL_G2) contained in the frame as necessary.

FIG. 14 exemplarily shows that the ranging channel is allocated to several group regions in H-FDD. In FIG. 14, it is assumed that the number of groups is 2. If UEs have already been classified into individual groups, each UE will use only regions to which the UE pertains, so that each UE uses a period (Td2) corresponding to the length of a single frame. Such allocation is suitable to a channel of periodic ranging or a channel of bandwidth request transmission (or ranging). On the other hand, a division region for each group may be considered meaningless in UEs not belonging to a specific group. In this case, differently from the period (Td2), it can be understood that the period (Td1) of the ranging channel is decided in units of the UL region length of each group. If individual groups have different UL region lengths, two different lengths may be repeatedly applied to the period (Td1) according to the length of each UL region. Assuming that there is no distinction between group regions, this assumption may be suitable to channel allocation for the initial ranging or the handover ranging.

FIG. 15 exemplarily shows that a ranging channel is allocated in H-FDD irrespective of several group regions. In FIG. 15, it is assumed that there are two groups for convenience of description and better understanding of the present invention. However, the ranging channel is arranged at every period (Td) irrespective of group regions. UE belonging to each group can use a ranging channel contained in a group of the UE, and another UE not belonging to the group can recognize and use the ranging channel position irrespective of individual group regions. The above-mentioned method is suitable to channels for initial ranging or handover ranging to be performed before UEs are distributed to groups.

DETAILED EXAMPLE 7

Offset Applied in Units of Cell or Sector

If one BS supports a plurality of cells or sectors, the BS may be implemented by only one hardware for specific processing. Preferably, the BS may receive ranging channels of neighbor cells or neighbor sectors without any overlap. In order to allocate ranging channels of neighbor cells or neighbor sectors to different positions, different offsets may be applied to time positions and/or frequency positions of the ranging channels. The offsets may be established in units of a subframe or an OFDM symbol.

Figure 16:
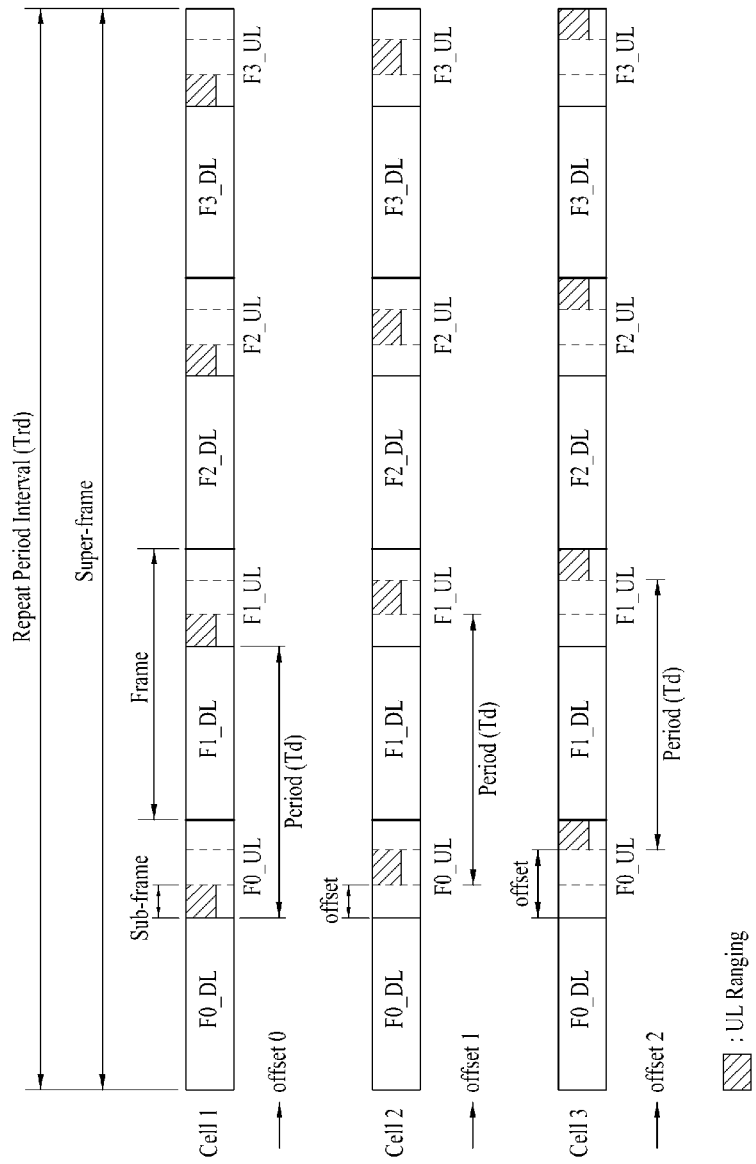
FIG. 16 exemplarily shows that control channels are allocated to different positions in units of a cell or a sector using an offset according to one embodiment of the present invention.

FIG. 16 exemplarily shows that an offset is applied to a time position of a ranging channel for each cell.

Referring to FIG. 16, the repeat period interval (Trd) may be set to the length of a superframe, the period (Td) may be set to the length of one frame, and an offset may be established in units of a subframe. An offset of Cell 1 is set to zero (0), so that a ranging channel of the Cell 1 starts from a first UL subframe. An offset of Cell 2 is set to 1, so that a ranging channel of the Cell 2 starts from a second UL subframe. An offset of Cell 3 is set to 2, so that a ranging channel of the Cell 3 starts from a third UL subframe. Since different offsets are applied to each cells, the BS receives ranging signals of neighbor cells or neighbor sectors without any overlap, so that the received ranging signals can be processed using hardware alone.

As can be seen from FIG. 16, an offset may be separately signaled or may be indicated using values represented in a table considering the offset. A detailed description thereof will be given below. Although the example of FIG. 16 has been disclosed in terms of a TDD scheme, the same offset as that of the TDD scheme may also be applied to the FDD scheme. In addition, although the example of FIG. 16 shows that the offset is applied only to a time position of the ranging channel, the offset may also be applied to the frequency position or may be applied to time/frequency positions. In addition, although the above-mentioned description discloses an offset that is used to identify a cell or a sector, it should be noted that the offset may also be used to identify a UE group.

Although the above-mentioned examples have exemplarily disclosed that one ranging channel (or one ranging slot) is allocated to each period (Td) for convenience of description, a plurality of ranging channels may also be allocated in time/frequency domains at every period (Td) as necessary. In this case, additional signaling for indicating a plurality of ranging channels is needed. In order to reduce signaling overhead, a plurality of ranging channels may be assigned to either the time or frequency domain as necessary. In this case, although several ranging channels are not adjacent to each other in the time and frequency domains, these ranging channels have no influence upon the effects and advantages of the present invention. In addition, ranging channels may be referred to by different names such as ranging slots, etc.

The size of the ranging channel applied to the present invention has been arbitrarily selected. However, especially, if the ranging channel is located at the end of the frame, it is necessary for the ranging channel not to move to the next frame in consideration of the size of the ranging channel.

The present invention can perform signaling all parameters related to the repeat period interval (Trd), the period (Td), the frequency position, etc., and the entire supporting structure may be configured in a table, and the table-formatted structure may be used. In addition, a specific parameter may be fixed to a fixed value, so that signaling may be omitted and the entire structure composed of only signaled parameters is configured in table form.

Embodiment

For convenience of description and better understanding of the present invention, it is assumed that the repeat period interval (Trd) for use in the following examples is identical to the period of a superframe. In this case, it is preferable that ranging channel information be signaled through a superframe header. The ranging channel information may be transmitted to a primary broadcast channel or a secondary broadcast channel. Information about which one of the four frames includes a ranging channel may be signaled through only one bit. Such examples are shown in the following table 3.

TABLE 3

| Configuration | Frame number within a super-frame | Period |
| --- | --- | --- |
| 0 | All frames | 5 ms |
| 1 | Even frames | 10 ms |

Referring to Table 3, if the BS broadcasts configuration data '0', each UE can recognize that a ranging channel is only present in all frames. On the other hand, if the BS broadcasts configuration data '1', each UE can recognize that a ranging channel is present only in even frames. Assuming that the superframe length is 20 ms and the frame length is 5 ms, the configuration data '0' may indicate the presence of a ranging channel having the period (Td) of 5 ms, and the other configuration data '1' may indicate the presence of a ranging channel having the period (Td) of 10 ms. Although the above-mentioned example assumes that the ranging channel is present in odd preambles, the ranging channel may also be present only in the even frames as necessary.

In addition, information signaling may be performed through 2 bits. In this case, four configurations may be possible. The following Table 4 exemplarily shows that the position of a ranging channel in a superframe having a repeat period interval (Trd) is signaled through 2 bits.

TABLE 4

| Configuration | Frame number within a super-frame | Period |
| --- | --- | --- |
| 0 | All frames | 5 ms |
| 1 | Odd frames | 10 ms |
| 2 | Even frames | 10 ms |
| 3 | 1st frame | 20 ms |

Referring to Table 4, if the BS broadcasts configuration data '0', each UE can recognize that a ranging channel is present in all frames. On the other hand, if the BS broadcasts configuration data '1', each UE can recognize that a ranging channel is present only in even frames. If the BS performs broadcasting of configuration data '2', each UE can recognize that a ranging channel is present only in even frames. Although configuration '1' and configuration '2' employ different ranging channel positions, two configurations '1' and '2' have the same period (Td) of 10 ms. On the other hand, if the BS broadcasts configuration '3', each UE can recognize that a ranging channel is present only in a first frame. Configuration '3' indicates that a ranging channel is allocated only to a first frame. In this case, the period (Td) of the ranging channel is 20 ms. Although configuration '3' of Table 4 exemplarily shows that a ranging channel is allocated only to a first frame, the scope or spirit of the present invention is not limited thereto, and the ranging channel may also be allocated to a certain specific frame such that it may have the period (Td) of 20 ms.

By means of Table 1 or Table 2, which frame includes a ranging channel in the superframe can be recognized. Thereafter, information about time and frequency positions contained in a frame, information about the number of ranging channels (or the number of slots) in the frame, and the like may be indicated through additional signaling, or the above-mentioned information may be pre-defined between the BS and the UE.

The time position in the frame of the ranging channel may be indicated by x bits greater than zero (0), and may use a fixed position without any signaling. The fixed time position within the frame may be applied in different ways according to multiplexing schemes (TDD, H-FDD and F-FDD) of UL and DL regions. For example, if the UL region and the DL region are multiplexed according to the TDD scheme, the time position of a ranging channel may be predefined as a first subframe of a 16m UL region in a legacy mode. The time position of the ranging channel may be equally applied irrespective of multiplexing schemes (e.g., TDD or FDD scheme) of the 16e and 16m regions. In the case of the 16m-only mode, the time position of the ranging channel may be predefined as a first subframe of the UL region contained in the frame. For another example, if the UL region and the DL region are multiplexed using the H-FDD scheme, the time position in the frame of the ranging channel may be determined to be a first or last subframe. For still another example, the time position in the frame of the ranging channel may be determined to be a first subframe of a second group region contained in the UL frame. For still another example, if the UL region and the DL region are multiplexed using the F-FDD scheme, the time position in the frame of the ranging channel may be determined to be a first or last subframe. For still another example, a time position in a frame of a ranging channel may be fixed to a specific subframe.

In addition, an offset for using different ranging channel positions among several cells or sectors (within one BS) may be additionally signaled through one or two bits. In addition, the following configurations may be utilized in consideration of such an offset. The following Tables 5 and 6 show such examples.

TABLE 5

| Configuration | Sub-frame number within a frame | Frame number within a super-frame | Period |
| --- | --- | --- | --- |
| 0 | 0 | All frames | 5 ms |
| 1 | 1 | | |
| 2 | 2 | | |
| 3 | 0 | Odd frames | 10 ms |
| 4 | 1 | | |
| 5 | 2 | | |

TABLE 6

| Configuration | Sub-frame number within a frame | Frame number within a super-frame | Period |
| --- | --- | --- | --- |
| 0 | 0 | All frames | 5 ms |
| 1 | 1 | | |
| 2 | 2 | | |
| 3 | 0 | Odd frames | 10 ms |
| 4 | 1 | | |
| 5 | 2 | | |
| 6 | 0 | Even frames | 10 ms |
| 7 | 1 | | |
| 8 | 2 | | |
| 9 | 0 | 1st frame | 20 ms |
| 10 | 1 | | |
| 11 | 2 | | |

Except that an offset is applied to Tables 5 and 6, Tables 5 and 6 are basically identical to Tables 3 and 4. In FIGS. 5 and 6, subframe offsets of 0~3 may be indicated according to configuration information. The ranging channel positions of a neighbor cell or a neighbor sector may be established in different ways.

In Tables 3 to 6, position information of a frequency domain of a ranging channel may be indicated through y bits, and may be fixed without any signaling. If a fixed position in the frame is used, it is preferable that the ranging channel be located at both ends of the system frequency band as shown in FIG. 8. For example, at the even frame, the lowest frequency band is used in the system frequency band. At the odd frame, the highest frequency band is used in the system frequency band. In this case, the position of a guard band contained in the ranging channel may be changed according to a frequency band allocated as shown in FIG. 9.

After a frame position of a ranging channel and time/frequency positions contained in a frame are signaled or predetermined through the above-mentioned methods, the number of (neighbor) ranging channels may be indicated through z bits. In this case, preferably, in order to reduce signaling overhead, signaling information includes information about the number of physically- or logically-contiguous ranging channels. In this case, allocation of contiguous channels may be predetermined in the order of time or frequency. In addition, allocation in time and frequency domains may be performed according to predetermined priorities. For example, assuming that such allocation in time and frequency domains is performed and allocation in the frequency domain has priority over allocation in the time domain, the signaled number of ranging channels may first be allocated to the frequency domain. In the meantime, if the ranging channel is no longer allocated to the frequency domain, time may be increased, and the ranging channel may be re-allocated to the frequency domain ranging from the lowest physical or logical frequency bands (or indexes). In this case, if the ranging channel is located at the end of any one side of the frequency band, individual channels are allocated to the end (where resources are present) of the other side of the frequency band. In other words, an allocation direction of the ranging channel in a frequency domain may be applied in different ways. For example, the number of ranging channels within each frame may be signaled through 2 bits. In addition, the number of ranging channels in each frame may be signaled through 3 bits. The number of contiguous ranging channels may be applied in different ways according to the aforementioned loads. For example, the number of ranging channels is signaled in two ways. If a ranging channel is present in the front two frames, one of the signaled numbers of ranging channels is used. If a ranging channel is present in the rear two frames, the other one of the signaled numbers of ranging channels may be used. For another example, the number of ranging channels may be signaled through one type. If a ranging channel is present in the front one frame, as many ranging channels as the signaled number are used. If the ranging channel is present in the remaining frames, as many ranging channels as the fixed number (e.g., 1) may be used.

In the F-FDD scheme, the present invention may use a method for interpreting the position of a ranging channel differently from the TDD scheme. First, in accordance with the TDD scheme, as shown in Table 4, 2-bit signaling may be used. At the even frame, the lowest frequency band may be used in the system frequency band. At the odd frame, the highest frequency band may be used in the system frequency band. In this case, if the number of contiguous ranging channels is indicated by 3 bits (a total of 8 ranging channels), a total of 5-bit signaling is required. In addition, if the number of contiguous ranging channels is indicated by 2 bits (a total of 4 channels), a total of 4-bit signaling is required. In accordance with the TDD scheme, as described above, time and frequency positions of the ranging channels contained in a superframe can be recognized. On the other hand, in accordance with the F-FDD scheme, the same signaling information may be used in different ways as necessary. For example, a total of k bits used in the TDD scheme may be re-interpreted according to one or two meanings as necessary. i bits (where $i \geqq 0$) may indicate an offset of the start subframe contained in a superframe, and j bits (where $j \geqq 0$) may indicate the period (Td) of each ranging channel contained in the superframe in units of a subframe. In another method, i bits (where $i \geqq 1$) may indicate an offset of the start subframe contained in a frame, and j bits (where $j \geqq 1$) may indicate the period of each ranging channel contained in the frame in units of a subframe. In this case, the start position of the i value is fixed to a specific value (e.g., 0) without any signaling, and the j value alone may be notified. Table-formatting considering the above-mentioned two formats may be possible. The following Table 7 exemplarily shows that information signaling may be performed through 4 bits in consideration of an offset.

TABLE 7

| Configuration | Sub-frame number and frame number in super-frame (sub-frame number of used frames) | Period |
|---|---|---|
| 0 | 0 of 1st frame | 20 ms |
| 1 | 1 of 1st frame | 20 ms |
| 2 | 2 of 1st frame | 30 ms |
| 3 | 0 of odd frames | 10 ms |
| 4 | 1 of odd frames | 10 ms |
| 5 | 2 of odd frames | 10 ms |
| 6 | 0 of every frames | 5 ms |
| 7 | 1 of every frames | 5 ms |
| 8 | 2 of every frames | 5 ms |
| 9 | 0, 4 of every frames | 2.4550 ms |
| 10 | 1, 6 of every frames | 2.4550 ms |
| 11 | 2, 6 of every frames | 2.4550 ms |
| 12 | 0, 3, 5 of every frames | 1.3510 ms |
| 13 | 1, 4, 6 of every frames | 1.3510 ms |
| 14 | 2, 5, 7 of every frames | 1.3510 ms |
| 15 | every subframe of every frames | 0.617 ms |

Referring to Table 7, each of configurations 0 to 2 may have the period (Td) of 20 ms. A corresponding subframe of a first frame of a superframe may include a ranging channel. Each of configurations 3 to 5 may have the period (Td) of 10 ms, and may have a ranging channel in the corresponding subframe of an odd frame. Each of configurations 6 to 8 may have the period (Td) of 5 ms, and the corresponding subframe of all frames includes a ranging channel. Each of configurations 9 to 11 may have the period Td (2.4680 us) of four subframes, and the corresponding subframe of all frames includes a ranging channel. Each of configurations 12 to 14 may have the period Td (1.8510 us) of two subframes, and the corresponding subframe of all frames includes a ranging channel. Configuration of 15 may have the period Td (0.617 us) of one subframe, and a ranging channel is assigned to each subframe of the frames. In order to reduce the number of signaling bits, only some parts of the configurations shown in Table 7 are extracted, and may be constructed in an actual table.

The above-mentioned example may be applied in different ways according to individual channels. For example, different methods may be applied to initial ranging, periodic ranging, handover ranging, and bandwidth ranging.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/ or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station (BS) and a terminal (UE). Specific operations to be conducted by the base station in the present invention may also be conducted by an upper node of the base station (BS) as necessary. In other words, it will be obvious to those skilled in the art that various operations for enabling the base station to communicate with a UE (terminal) in a network composed of several network nodes including the base station (BS) will be conducted by the base station (BS) or other network nodes other than the base station (BS). The term 'Base Station (BS)' may be replaced with the term 'fixed station', 'Node-B', 'eNode-B (eNB)', or access point (AP) as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

Industrial Applicability

The present invention is applicable to a wireless mobile communication system. In more detail, the present invention can be applied to a wireless communication system for supporting at least one of Time Division Duplex (TDD), Full-Frequency Division Diplex (F-FDD), and Half-Frequency Division Duplex (H-FDD) schemes. In more detail, the present invention is applicable to a method for uplink transmitting control information in a mobile communication system.

What is claimed is:

1. A method for uplink transmitting a ranging channel signal by a mobile station in a mobile communication system that performs communication using a superframe, the method comprising:

receiving ranging channel configuration information for indicating a first period related to a time interval between two neighboring ranging channel resources and a second period related to a time interval in which the first period is applied, wherein the two neighboring ranging channel resources are repeatedly allocated, wherein the second period is repeated in a time domain and longer than the first period, and wherein the superframe includes four frames, each frame includes a plurality of subframes, and each subframe includes a plurality of orthogonal frequency division multiple access (OFDMA) symbols; and transmitting the ranging channel signal using one of the two neighboring ranging channel resources, wherein the ranging channel signal comprises a cyclic prefix, a preamble and a guard time that spans the plurality of OFDMA symbols in one or more subframes, wherein the two neighboring ranging channel resources are alternatively frequency-hopped to both ends of a system band in accordance with the first period, and one of two guard bands of the ranging channel signal overlaps with one of two guard bands of the system band.

2. The method according to claim 1, wherein the first period is indicated on a basis of any one of a superframe unit, a frame unit, a subframe unit, or an OFDMA symbol unit, and the second period is indicated on a basis of a superframe's divisor unit or a superframe's multiple unit.

3. The method according to claim 1, wherein the ranging channel configuration information is received through a header of the superframe, and the header of the superframe is located in one or more starting OFDM symbols of the subframe.

4. The method according to claim 1, wherein the plural two neighboring ranging channel resources are located in a time domain start or end part of the time-frequency resource region for the uplink transmission.

5. The method according to claim 1, wherein the first period is started after an offset elapses from a start point of the second period.

6. The method according to claim 5, wherein the first period is started after an offset elapses from a preamble.

7. The method according to claim 5, wherein the offset is indicated on a basis of any one of a frame unit, a superframe unit, or an OFDMA symbol unit.

8. The method according to claim 1, wherein the first period is applied in units of a user equipment (UE) group.

9. The method according to claim 1, wherein the first period and the second period are indicated using an index for indicating a combination of the first period and the second period.

* * * * *